US008583167B2

(12) United States Patent
Chun

(10) Patent No.: US 8,583,167 B2
(45) Date of Patent: Nov. 12, 2013

(54) MOBILE TELEPHONE SUDDEN IMPACT WARNING AND REPORTING FEATURE

(76) Inventor: James Chun, San Diego, CA (US)

(*) Notice: Subject to any disclaimer, the term of this patent is extended or adjusted under 35 U.S.C. 154(b) by 0 days.

(21) Appl. No.: 13/442,758

(22) Filed: Apr. 9, 2012

(65) Prior Publication Data
US 2013/0102326 A1 Apr. 25, 2013

Related U.S. Application Data

(60) Provisional application No. 61/473,749, filed on Apr. 9, 2011.

(51) Int. Cl.
H04M 1/00 (2006.01)
(52) U.S. Cl.
USPC ............ 455/550.1; 455/418; 455/404.1; 340/426.19
(58) Field of Classification Search
USPC ............ 455/550.1, 418, 404.1; 340/426.19
See application file for complete search history.

(56) References Cited

U.S. PATENT DOCUMENTS

| 2003/0212311 | A1* | 11/2003 | Nova et al. | 600/300 |
| 2005/0030224 | A1* | 2/2005 | Koch | 342/357.07 |
| 2006/0152372 | A1* | 7/2006 | Stout | 340/573.1 |
| 2010/0311385 | A1* | 12/2010 | Hurwitz | 455/404.1 |
| 2012/0162423 | A1* | 6/2012 | Xiao et al. | 348/148 |

* cited by examiner

Primary Examiner — Danh Le
(74) Attorney, Agent, or Firm — Dean A. Craine

(57) ABSTRACT

A warning system for wireless mobile telephones that notifies designated users and broadcast an audible sound when suddenly de-acceleration. The telephone is coupled to a wireless telephone transmitter configured to operate with a nearby compatible wireless telephone network. The telephone includes a display, a speaker, an internal accelerometer and a programmable, impact-activated software program loaded into its working memory. The software program when executed continuously monitors for triggering signals from the internal accelerometer. When a triggering signal is produced, the software program is activated into an alarm state which then performs the notifications tasks designated by the user during the setup steps. The software program is configured to presents various input menus on the display that enables the user to turn the system ON and OFF, selective an alarm mode to be used, select a pre-alarm time period, an alarm duration period, and adjust the sensitivity of the accelerometer.

11 Claims, 7 Drawing Sheets

MOBILE TELEPHONE SUDDEN IMPACT WARNING AND REPORTING FEATURE

This utility patent application is based on and claims the priority filing date of U.S. provisional patent application, Application No. 61/473,749, filed on Apr. 9, 2011.

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to personal, portable security systems, and more particularly to such systems that have a built-in alarm component that transmits an audible alarm either to remote or local rescuers informing them that assistance is needed.

2. Description of the Related Art

Today, most adults and teenagers carry wireless mobile telephones in the pockets or purses when they leave home. Many hikers, joggers or walkers carry mobile telephones in the hands when they exercise outdoors. When away from the home, it is common for individuals to accidentally fall or to be attacked or robbed by a stranger. When this occurs, the individual's mobile telephone may be accidentally dislodged or intentionally thrown to the ground. After the attack or fall, the mobile telephone may be beyond the victim's reach, but he or she may be unconscious or too injured to place a telephone call for assistance or help. Sometimes, the injured individual may only need help from his or her family members or friends and not from the police or fireman.

In some instances, when an injury occurs, the exact location of the individual may not be known to his or her family or friends. More recently, mobile telephones with applications that enable friends to track the location of their friends and family members. Many individuals find such tracking features to be intrusive. Also, the tracking features are not equip to automatically allow notify the other parties when an individual needs assistance.

What is needed is a wireless mobile telephone based security system that causes a the mobile telephone to automatically call or send a tracking signal at least one designated party when the user's mobile telephone undergoes a sudden de-acceleration that common occurs when the user falls, hit, or when the mobile telephone impacts a hard surface without destroying the mobile telephone. When a sudden de-acceleration occurs, the current address or the current latitude and longitudinal coordinates or the mobile telephones should be then transmitted to the receiving party.

SUMMARY OF THE INVENTION

At the heart of the invention is the discovery that wireless mobile telephones that are personally carried by everyone over the age of ten, often undergo sudden de-acceleration when the individual falls is involved in an accident, or is attacked, that the de-acceleration that can be used as trigger that causes the mobile telephone automatically place a telephone call or transmit a location signal to a designated party.

The system uses a wireless mobile telephone that includes a processor with working memory coupled to an internal wireless telephone transmitter configured for marking cellular telephone calls over a nearby compatible wireless telephone and data network. The telephone includes a display, a speaker, an internal accelerometer and a programmable, impact-activated software program loaded into its working memory. The software program when executed is designed to continuously monitor for triggering signals from the internal accelerometer. When a triggering signal is received, the software program is then activated into an alarm state which then performs notifications tasks designated by the user.

When initially loaded into the mobile telephone, the software program is configured to presents various input menus on the telephone's display that enables the user to turn ON and OFF the alarm system, selective the alarm mode (telephone call, location designation only, with and without audible alarm, or audible alarm only), and to adjust the sensitivity of the accelerometer. Menu pages are also presented on the display that enable the user to activate a pre-alarm time period, and to indicate its duration before an alarm signal is produced. The system is also coupled to a message recorder that plays back a standard or pre-recorded audible message through the telephone network. In the message, the telephone's current location may also be communicated. In one embodiment, the pre-recorded message or another audible sound may be broadcast through telephone's speaker that can be heard by nearby rescuers.

The software program may also include an input code deactivate feature that enables the user to discontinue or override the automatic telephone call placement or the broadcast of the external in the event the device accidently undergoes de-acceleration to activate the system.

Figure 2:
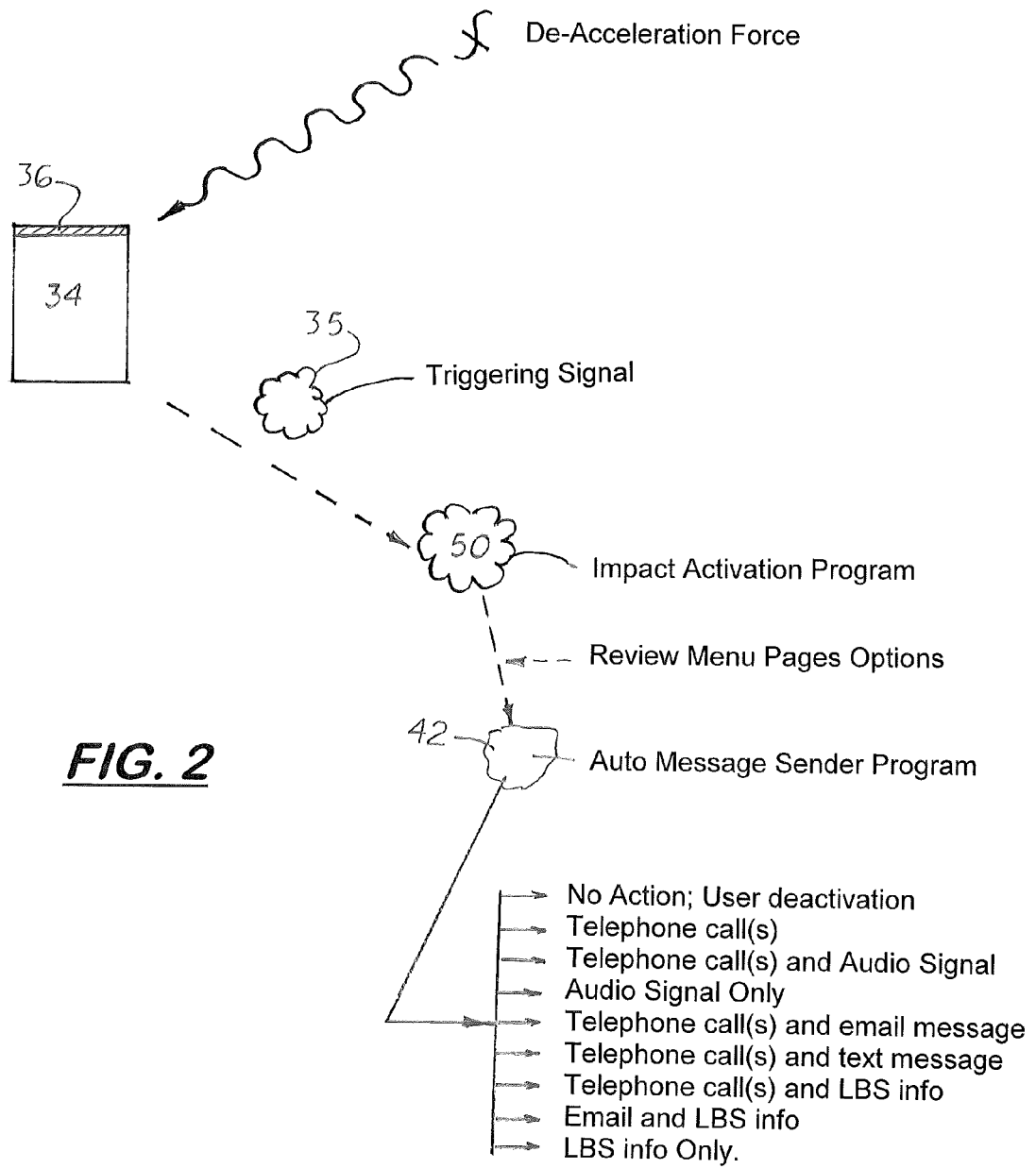

Shown in FIG. 2 is an illustration showing a de-acceleration force f exerted on the telephone 10 that causes the accelerometer to generate a trigger signal that is transmitted to the impact activation program.

Figure 3:
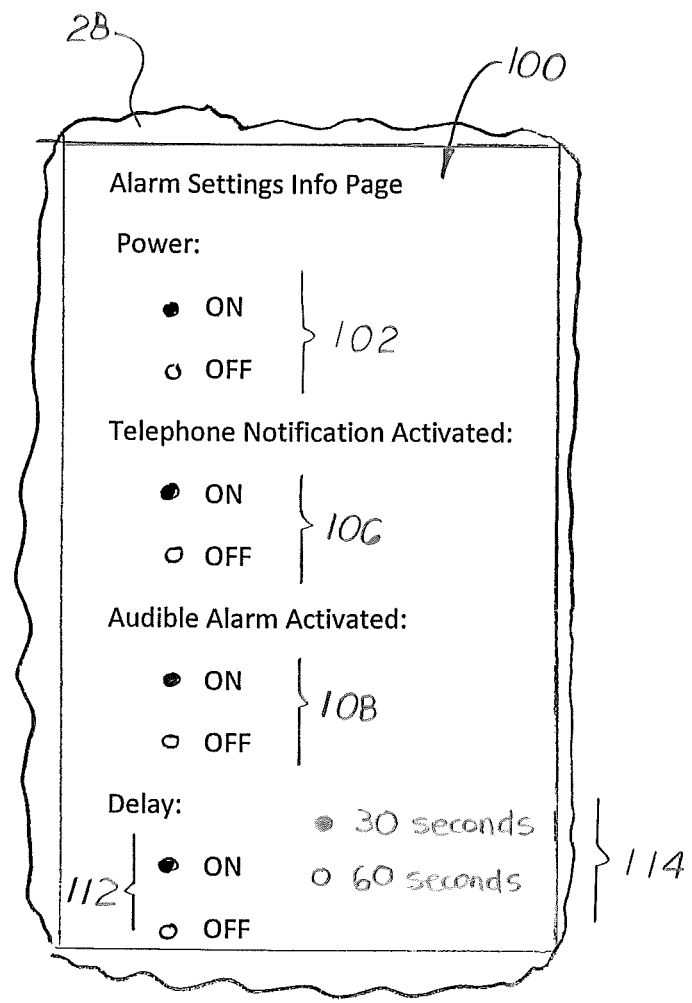

FIG. 3 is an illustration showing the Alarm Setting Info Page.

Figure 4:
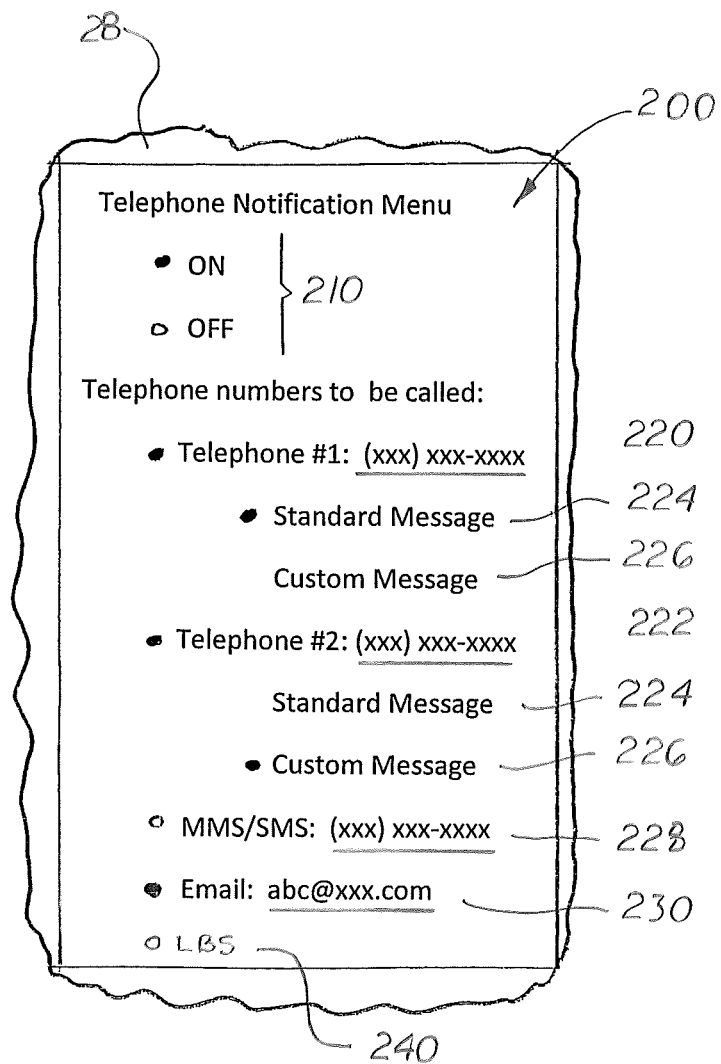

FIG. 4 is an illustration of the Telephone Notification Menu page.

Figure 5:
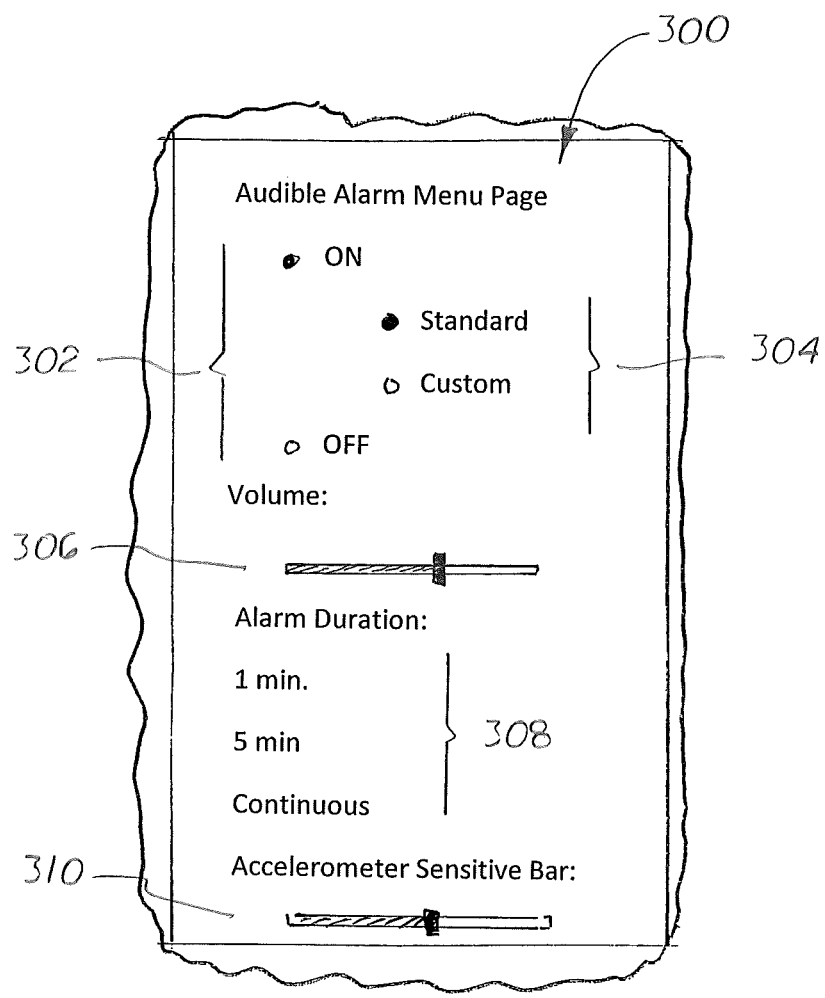

FIG. 5 is an illustration of the Audible Alarm Menu page.

Figure 6:
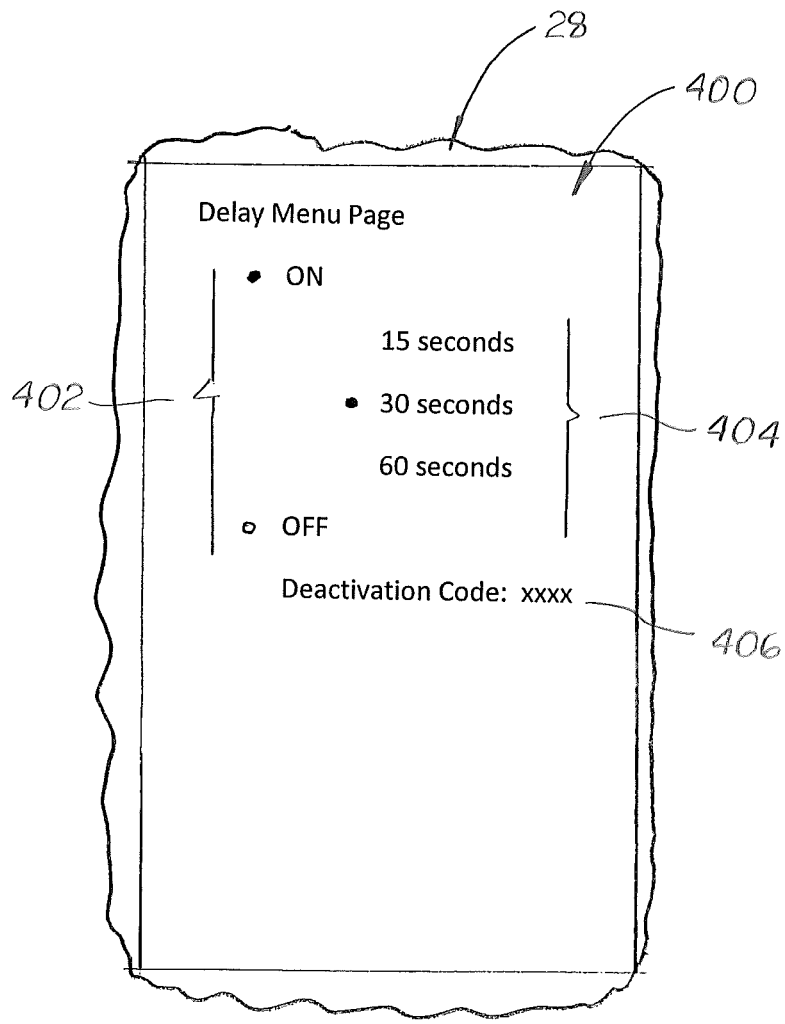

FIG. 6 is an illustration of the Delay Menu page.

Figure 7:
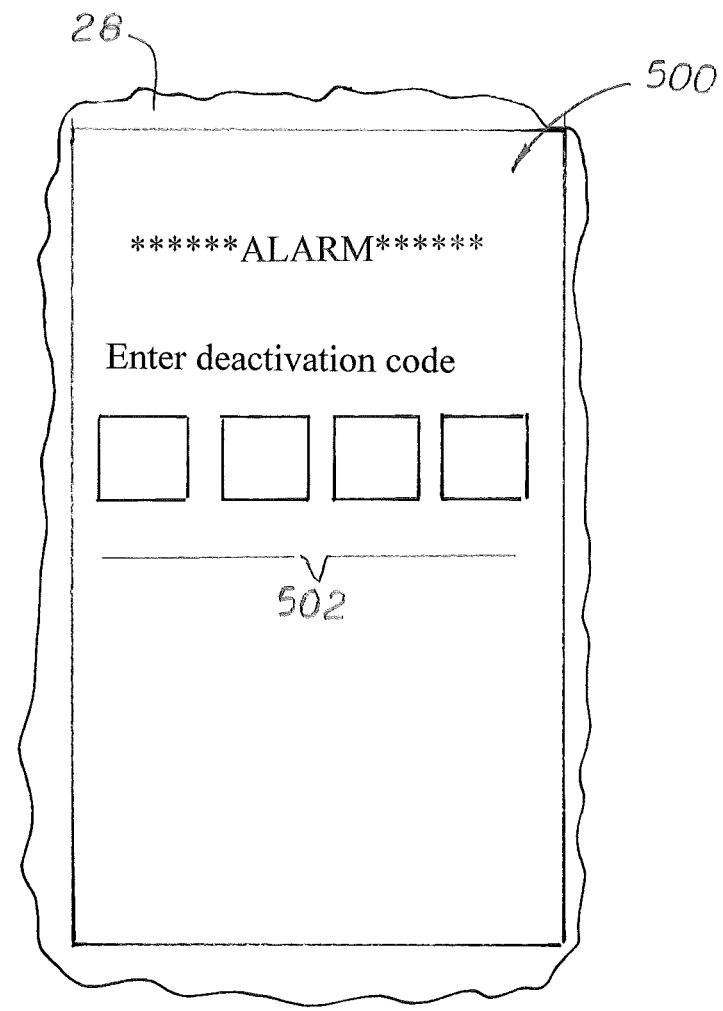

FIG. 7 is an illustration of the display when the alarm state has been activated and a deactivation window is presented to the user.

DESCRIPTION OF THE PREFERRED EMBODIMENT(S)

Referring to the accompanying Figs. is a wireless cellular telephone personally carried by an individual who when they accidentally fall, are involved in an accident, or are attacked, causes the wireless telephone to undergo a de-acceleration that, in turn automatically triggers an alarm state of an alarm software program executed and loaded into the memory of the wireless telephone that causes the telephone to automatically place a telephone call, send an email, transmit a MMS message, send location based information using Location services activated on the telephone. In addition or alternatively to the above modes, the system may also include an audible alarm feature that enables the wireless phone to broadcast a load audible sounding that can either deter an attack or assist rescuers in finding the victim.

Figure 1:
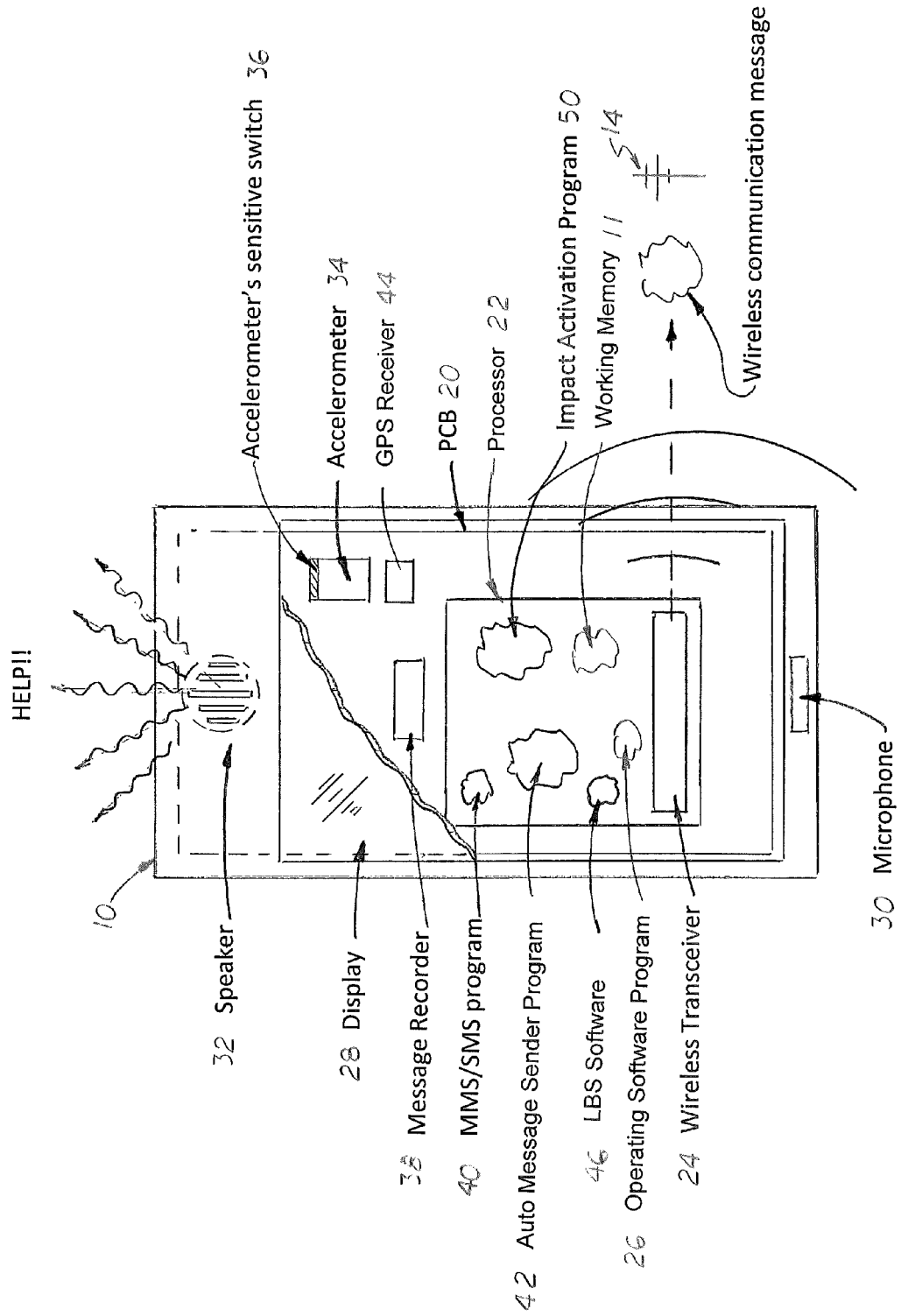
FIG. 1 is a front plan view of a wireless telephone that includes a display, a wireless network communication transceiver, an accelerometer and the sudden deceleration activated alarm and warning system.

As shown in FIG. 1, the wireless mobile telephone 10 includes a wireless transceiver 12 used to communicate with a nearby wireless telephone and data communication network 14. Located inside the telephone 10 is a printed circuit board 20 with a processor 22, a wireless transceiver 24, an operating software program 26, a display 28, a microphone 30, an internal speaker 32, and a three axis accelerometer 34 used to detect motion and orientation. Coupled to the acceleratory is an optional sensitivity switch 36. The telephone 10 may also include a message recorder 38 a MMS/SMS program 40, an Auto message sender program 42, and a GPS receiver 44 designed to receive a signal from a GPS and convert into a coordinate entry that can transmitted to the network, as discussed in RE42,927, which is now incorporated herein by reference. Also, loaded into the working memory 11 is a Location base services (LBS) software program 46.

Loaded into the working memory 11 of the telephone 12 is an impact activation software program 50 configured to use acceleration information from the accelerometer 34 and when specific amount of de-acceleration of the telephone 10 is detected. When a threshold of de-acceleration is reached, an activation signal is then transmitted to the software program 50 which is then activated to a heighted alarm state. When an alarm state is activated, the software program 50 then executes one or more tasks selected by the user during the setup stage.

Shown in FIG. 2 is an illustration showing a de-acceleration force f exerted on the telephone 10 that causes the accelerometer 34 to generate a trigger signal 35 that is transmitted to the impact activation program 50. The impact activation program 50 then reviews the menu pages options and proceeds according to the information selected. The impact activation program 50 then activates an auto message sender program which then determines which message is sent, activates the sounds via the internal speakers if necessary, auto dials the telephone numbers, auto creates and sends the emails and text messages to the designated recipients, collects and transmits the LBS information to the designated recipients. Also shown in FIG. 2 is the optional accelerator sensitivity switch 36 attached or coupled to the accelerator 34 that enables the user to adjusted the de-acceleration force needed to create the trigger signal 35.

FIG. 3 is an illustration of the Alarm Settings Info page 100 that tells the user the current settings for the telephone 10. The display 28 has touch screen functionality page 100 with Power ON and OFF switch/indicators 102. Telephone Notification Activation ON and OFF switch indicators 106, the Audible Alarm Activation ON or OFF switch/indicator 108 and the Delay ON and OFF switch indicator 112. During setup, the user activates or deactivates the impact warning and notification service using the Power ON and OFF switch/indicators 102. The user then manually activates Telephone Notification Activation ON and OFF switch indicators 104 so that the telephone automatically calls a designated telephone number on the Telephone notification Menu page 200 shown in FIG. 4. In addition, the user manually activates the Audible Alarm Activation ON or OFF switch/indicator 108 to instruct the telephone 10 to play or not play a loud audible sound via the speaker 32. The user also manually activates the Delay ON and OFF switch indicator 112 to instruct the telephone 10 to either call the designated telephone number or the audible alarm after 30 to 60 seconds. Option 30 or 60 second delay buttons 114 are also shown.

FIG. 4 is an illustration of the Telephone Notification Menu page 200 that includes touch activated Telephone Notification Menu ON and OFF indicators 210 similar to the Telephone Notification Activation ON and OFF switch indicators 110 shown on the first menu page 100. The Telephone Notification Menu page 200 also include Telephone No #1 entry line 220, and Telephone No #2 numbers entry line 222. Under each Telephone No entry line 220 and 222 is a standard or custom message option button 224, 226 which is automatically played to the receiving party associated with the entry lines 220, 220. Also, shown in FIG. 4 is a MMS/SMS telephone entry line 228 in which a recipient's telephone number is typed. Also shown is an email entry line 230 in which an email address is manually typed. When selected, an email message from the user is automatically sent from the telephone 10 to the designated email address. Also, shown in FIG. 4 is an LBS entry line 240 which, when checked, automatically transmits the user's address or GPS latitude and longitude information to the telephone of MMS/SMS recipient or email recipient.

FIG. 5 is an illustration of the Audible Alarm Menu page 300 that enables the user to selectively turn ON or OFF the audible alarm when an alarm triggering signal is sent from the accelerometer 38, adjust the volume of the alarm, select one of three possible duration settings, and adjust the accelerometer's sensitivity to different impacts. The menu page 300 includes a ON or OFF switches, 302, standard alarm sound or custom sound buttons 304, an Alarm Duration sliding bar and indicator 306, a Alarm Duration 1, 5, or Continuation buttons 308, and an Accelerometer sliding bar and indicator 310.

FIG. 6 is an illustration of the Delay Menu page 400 that enables the user to select whether the telephone dialer or email /text message or audible alarm are activated immediately when an alarm activation state occurs or are activated after a delay period indicated the page. The Delay Menu page 400 includes an ON or Off Switch 402 and a 15, 30 and 60 second delay time buttons that are used to prevent false alarms. Also shown in the Delay Menu page is an input deactivate code line 406 in which a secret code is inputted that the user must input to discontinue or override the automatic telephone call placement act or the broadcast of the external if the device accidently undergoes de-acceleration to activate the system.

The impact activation program 50 presents various setup menu pages 200, 300 and 440 on the telephone's display 28 that enable the user to manually activate or deactive the alarm features, and to selectively control what type of alarm is created, (telephone call, MMS/SMS, email, LBS information), what type of message or alarm signal is communicated (standard or customized audio message, text message, email, address information or GPS coordination information), to designated the recipient(s) of the message or alarm signal, and when is the message sent (immediately upon creation of the trigger signal or on a delayed basis). , When an audio alarm is selected, the user can choose between a standard alarm sound (ie. police or air raid siren sounds) or a custom sound (barking dog) and the volume level of the sound. A false alarm prevent feature that allows the user to deactive the alarm is also provided.

The wireless telephone 10 may also include an optional message recorder 38 that enables the user to record a custom message or alarm sound. Also, as mentioned above, the telephone 10 may also include a LBS software program 46 and a GPS receiver 34 that enables the telephone 10 to tell the recipient the telephone's current location only or before or at the end of the alarm message.

FIG. 7 is an illustration of the display 28 when the alarm state has been activated and a deactivation window 500 is presented to the user in which the deactivation code is imputed to deactivate the alarm.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A mobile telephone with sudden impact warning and reporting features, comprising:
   a. wireless mobile telephone configured for communication with a wireless telephone and data network, said telephone includes a display, an internal speaker, and internal microphone, a GPS receiver, and a processor that includes working memory;
   b. a de-accelerator chip located inside said mobile telephone, said de-accelerator chip configured to generate a triggering signal when impacted by a threshold de-accelerating force;
   c. an impact activation software program executed by said processor, said impact activation software program configured to receive said triggering signal from said de-accelerator chip;
   d. an auto message sender program executed by said processor, said auto message sender program configured to carry out at least one of the following tasks when said activation program receives a triggering signal: generate an audio signal through said speaker; place a telephone call to a desired telephone number; send an email message to a designated email addressee; send a text message to a designated telephone number, transmit GPS location information to designated telephone, email or text recipients; and,
   e. a menu page in which a deactivation code is entered to deactivate the alarm state.

2. The portable device as recited in claim 1, wherein said impact activation software program presents various input menus on said display that enables a user turn ON or OFF said impact activation program.

3. The mobile telephone as recited in claim 1, wherein said impact activation software program presents a menu page that enables the user to adjust the level of sensitivity of said accelerometer.

4. The mobile telephone claim 1, wherein said impact activation software program presents a menu page that enables a user to delay the activity of said auto message sender program a predetermine amount of time.

5. The mobile device as recited in claim 1, wherein said impact activation software program presents a menu page that enables a user to select at least one telephone number to be called when said triggering signal is received.

6. A mobile telephone with sudden impact warning and reporting features, comprising:
   a. wireless mobile telephone configured for communication with a wireless telephone and data network, said telephone includes a display, an internal speaker, and internal microphone, a GPS receiver, and a processor that includes working memory;
   b. a de-accelerator chip located inside said mobile telephone, said de-accelerator chip configured to generate a triggering signal when impacted by a threshold de-accelerating force;
   c. an impact activation software program executed by said processor, said impact activation software program configured to receive said triggering signal from said de-accelerator chip, said impact activation software program presents a menu page that enables a user to select an audio sound to be played through said speaker when said triggering signal is received;
   d. an auto message sender program executed by said processor, said auto message sender program configured to carry out at least one of the following tasks when said activation program receives a triggering signal: generate an audio signal through said speaker; place a telephone call to a desired telephone number; send an email message to a designated email addressee; send a text message to a designated telephone number, transmit GPS location information to designated telephone, email or text recipients; and,
   e. an alarm duration button the enables said user to selected a duration of time the alarm signal is produced.

7. The mobile device as recited in claim 6, further including a menu page that enables said user to choose between a standard alarm sound or a custom alarm sound.

8. The mobile device as recited in claim 6, further including an alarm volume control button that enables said user to adjust the volume of the sound from said speaker.

9. The mobile device as recited in claim 6, further including an alarm duration button the enables said user to selected a duration of time the alarm signal is produced.

10. The mobile device as recited in claim 6, further including a deactivation menu page with an empty deactivation code window presented therein in which a deactivation code is manually imputed.

11. A mobile telephone with sudden impact warning and reporting features, comprising:
    a. wireless mobile telephone configured for communication with a wireless telephone and data network, said telephone includes a display, an internal speaker, and internal microphone, a GPS receiver, and a processor that includes working memory;
    b. a de-accelerator chip located inside said mobile telephone, said de-accelerator chip configured to generate a triggering signal when impacted by a threshold de-accelerating force;
    c. an impact activation software program executed by said processor, said impact activation software program configured to receive said triggering signal from said de-accelerator chip, said impact activation software program presents a menu page that enables a user to select an audio sound to be played through said speaker when said triggering signal is received;
    d. an auto message sender program executed by said processor, said auto message sender program configured to carry out at least one of the following tasks when said activation program receives a triggering signal: generate an audio signal through said speaker; place a telephone call to a desired telephone number; send an email message to a designated email addressee; send a text message to a designated telephone number, transmit GPS location information to designated telephone, email or text recipients; and,
    e. a deactivation menu page with an empty deactivation code window presented therein in which a deactivation code is manually imputed.

* * * * *